Patented May 26, 1942

2,284,468

UNITED STATES PATENT OFFICE 2,284,468

HYDROCARBON SYNTHESIS

Robert E. Burk and Everett C. Hughes, Cleveland Heights, Ohio, assignors to The Standard Oil Company, Cleveland, Ohio, a corporation of Ohio No Drawing. Application February 6, 1939, Serial No. 254,891

6 Claims. (Cl. 260—668)

It has been known for some time to convert aliphatic hydrocarbons into hydrocarbons of aromatic type by subjecting the material to a suitable elevated temperature and catalytic action. The practice of such operation however has been very seriously handicapped, the best catalysts available being subject to quite narrow and critical temperature range for their operation, and being subject to very rapid deterioration in activity and being difficult to regenerate sufficiently practically. We have found that in the operation hydrogen which is formed tends to so strongly adsorb on the catalyst as to rapidly hinder the progress of the reaction. Again, in the heating of the catalyst by customary external heating means, due to the criticalness of the temperature range and the very inefficiently controlled heat transfer, undesirably limited cross-section areas of the catalytic beds and expensive increases in heat transfer areas to enclose said bed or contact surfaces have been required. In accordance with the present invention however, it now becomes possible to carry on such reactions and turn the hydrogen to effective use in situ, as a contributor to a more effective heating of the catalyst, and a utilization in reaction to form other hydrocarbons.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The raw material to be operated upon may be any suitable aliphatic hydrocarbon material capable of yielding aromatic hydrocarbons in greater or less amount, and for instance it is advantageous to employ hydrocarbons in more or less narrow range of purity involving those of carbon chain length adequate to form $C_6$ and somewhat higher closed chain compounds, although the operativeness of the process is not closely contingent upon sharp segregation of raw material if efficiency is of lesser importance and it is desired to provide an aromatic content in a material merely initially aliphatic. Naphthas of aliphatic character or predominantly aliphatic character and fractionated more or less closely as desired in any given instance, may thus in general constitute desirable raw materials. The reaction is carried on in contact with a catalyst and at a temperature at which, in the case of a catalyst of the chromium oxide type, may be on the order of 700 to 1250° F., and preferably rather closely around 980° F. In association with such aromatizing catalyst, we provide another type of catalyst which carries on reaction between hydrogen, and an oxide of carbon, a typical reaction with hydrogen and carbon dioxide being the formation of methane and water, which at 980° F. is an exothermic reaction, to the extent of 46,300 calories per mol. Or ethylene and acetylene are used as alternatives for $CO_2$ or CO to react with $H_2$. By the association of such two types of catalysts, the aromatizing catalyst is thus enabled to carry on its operation untrammeled, and the exothermic heat applied in situ by the action of the other catalyst, supplies heat to the aromatizing catalyst and at the same time this other catalyst operates to clear away hydrogen as produced. By reason of the provision of the exothermic heat supply, the aromatizing catalyst may be placed in beds or masses relatively large, instead of being confined to the limitations heretofore necessary where the heat was supplied by external heating means. In the reaction of hydrogen with carbon dioxide the extent of exothermic generation of heat is as pointed out foregoing, and in reaction with carbon monoxide on the hydrogen, exothermic heat genertion on the order of 56,000 calories per gram molecule is available at 980° F. Particularly close control on the temperature of the catalytic mass is thus had by control of the auxiliary feed of carbon dioxide or carbon monoxide in the zone of reaction. Furthermore, as seen, the activity of the aromatizing catalyst is maintained, as the hindrance of the heretofore adsorbing hydrogen is taken care of. Thus, two kinds of action are associated together in supplemental coordination conducing to the formation of aromatic hydrocarbons and methane, and two kinds of catalysts are associated, which may be designated in general as aromatizing catalysts and cleaning and exothermic catalysts. For the aromatizing catalyst, a chromium oxide material is typical, and for example may be of $Cr_2O_3$ mol 20 per cent and $Al_2O_3$ mol 80 per cent, although this may be varied. The second-named or exothermic catalyst may be varied somewhat, but we find in general that a nickel oxide containing catalyst is particularly desirable. Thus, for instance an advantgeous form may be prepared by adsorbing about one-half of a solution containing 170 parts by weight of $Ni(NO_3)_2 6H_2O$ and 2 parts of $Th(NO_3)_4 12H_2O$ in 13 parts of water on 150 parts of activated alumina, this giving 10 per cent Ni and 0.2 per cent Th by weight. This after drying may be mixed with the aromatizing catalyst afore-mentioned, the catalysts being primarily separate and discrete particles. Aside from nickel oxide, there are certain other compounds that can be used for the exothermic catalyst. These are not all equally desirable, although providing the exothermic action more or less effectively, and of these we point out ruthenium, iron, cobalt, iridium, rhodium, osmium, platinum, molybdenum, palladium, and silver oxides, and one or more of these can be used like the nickel oxide, or with it, and may or may not be supported on charcoal, asbestos, pumice, kieselguhr, "Sil-o-Cel," silica gel and alumina, thoria or titania; and further we may in some cases include a promoter, viz. an oxide of vanadium, cerium, iron, thorium, cobalt, chromium, barium, strontium, calcium, manganese, magnesium, zinc, lead, molybdenum, copper, zirconium or aluminum. Thus, an effective exothermic catalyst may be made of nickel oxide and aluminum oxide adsorbed or coprecipitated; and another is zinc oxide prepared by calcining zinc carbonate pellets; and other useful combinations are $NiO-ThO_2$ on "Sil-o-Cel," NiO and $ThO_2$ on $Al_2O_3$, $MoO_3$ on $Al_2O_3$, $TiO_2$ gel, $Fe_2O_3-SnO_2-Al_2O_3$, and $ZnO-Cr_2O_3$. Where the raw hydrocarbon material which is being operated upon contains detrimental sulphur occasioning poisoning of nickel oxide and like forms of exothermic catalyst, we prefer to employ molybdenum sulphide or sulphides of iron, cobalt, etc., and certain oxides such as of molybdenum, manganese, zinc, etc., with or without silica gel. The nickel oxide catalyst may be reduced with $H_2$, and are also effective.

It will be understood that the two kinds of catalysts are associated, viz. the aromatizing catalyst, illustrated by the typical $Cr_2O_3-Al_2O_3$, and the exothermic catalyst, illustrated by typical $NiO-ThO_2-Al_2O_3$. And preferably these two kinds of catalysts are provided in mixture in the mass through which the hydrocarbon material is passed.

As an example: With a catalyst consisting of equal parts by volume of an aromatizing catalyst (20 per cent $Cr_2O_3$—80 per cent $Al_2O_3$) mixed with an exothermic catalyst ($NiO-ThO_2$ on $Al_2O_3$, prepared as described above), a naphtha of boiling range 140 to 420° F. was supplied to the catalyst and at the same time carbon dioxide was fed, the feed rates being 30 volumes of liquid naphtha per 30 volumes of the aromatizing catalyst and 1600 volumes (STP) of carbon dioxide per hour, the average temperature in the catalytic bed being 980° F., external heat having been applied initially in order to bring the material up to operating temperature. Among the off-take products, the uncondensible gas contained 36.7 per cent volume of methane, and only 55.2 per cent $H_2$. In the condensate an amount of water was found corresponding to 61 per cent of the $CO_2$ put in. Controlling the gas feed with the naphtha, the temperature of the catalytic bed was maintained at remarkable constancy and the aromatizing catalyst continues to operate instead of falling off sharply in action after a short time as customary without the exothermic associated catalyst.

In contrast, operating with similar feed conditions and temperature but with the aromatizing catalyst alone, without the exothermic catalyst ($NiO-ThO_2$), the off-take products showed no water and only 15.4 per cent vol. of methane, and the carbon dioxide went through unchanged, instead of being reacted as in the foregoing.

The spent catalysts are particularly easily and satisfactorily regenerated.

Other modes of applying the principle of the invention may be employed, change being made as regards the details described, provided the features stated in any of the following claims, or the equivalent of such, be employed.

We therefore particularly point out and distinctly claim as our invention:

1. In a process of the character described, changing an aliphatic naphtha to aromatics and hydrogen by heating in the presence of a chromium oxide containing catalyst at temperatures of 700–1250° F., and in the same reaction chamber concurrently reacting hydrogen so formed with a carbon oxide in the presence of a nickel oxide containing catalyst.

2. In a process of the character described, changing to aromatics and hydrogen aliphatic hydrocarbons capable of aromatization through chain-closing by heating in the presence of a chromium oxide containing catalyst at temperatures of 700–1250° F., and in the same reaction chamber concurrently reacting hydrogen so formed with a carbon oxide in the presence of a nickel oxide containing catalyst.

3. In a process of the character described, changing an aliphatic naphtha to aromatics and hydrogen by heating in the presence of a chromium oxide containing catalyst at temperatures of 700–1250° F., and in the same reaction chamber concurrently reacting hydrogen so formed with a carbon oxide in the presence of a separate metal oxide containing catalyst capable of hydrogenating said carbon oxide.

4. In a process of the character described, changing to aromatics and hydrogen aliphatic hydrocarbons capable of aromatization through chain-closing by heating in the presence of a chromium oxide containing catalyst at temperatures of 700–1250° F., and in the same reaction chamber concurrently reacting hydrogen so formed with a carbon oxide in the presence of a separate metal oxide hydrogenating catalyst capable of hydrogenating said carbon oxide.

5. In a process of changing to aromatics and hydrogen aliphatic hydrocarbons capable of aromatization through chain-closing by heating the aliphatic hydrocarbons in the presence of a chromium oxide containing catalyst under conditions of temperature and pressure as to produce aromatics and hydrogen, controlling the temperature by concurrently subjecting in the same reaction chamber hydrogen so formed to the action of a separate catalyst and a carbon oxide such catalyst being a nickel oxide containing catalyst.

6. In a process of changing to aromatics and hydrogen aliphatic hydrocarbons capable of aromatization through chain-closing by heating the aliphatic hydrocarbons in the presence of a chromium oxide containing catalyst under conditions of temperature and pressure as to produce aromatics and hydrogen, controlling the temperature by concurrently subjecting in the same reaction chamber hydrogen so formed to the action of a separate catalyst and a carbon oxide such catalyst being a metal oxide containing catalyst capable of hydrogenating said carbon oxide.

ROBERT E. BURK.
EVERETT C. HUGHES.